United States Patent [19]

Kyrtsos

[11] Patent Number: 5,550,743
[45] Date of Patent: Aug. 27, 1996

[54] GEOGRAPHIC LOCATOR OF A VEHICLE USING GPS AND ANGLES BETWEEN PAIRS OF ADJACENT BOUNDARY COORDINATE POINTS

[75] Inventor: Christos T. Kyrtsos, Southfield, Mich.

[73] Assignee: Eaton Corporation, Cleveland, Ohio

[21] Appl. No.: 388,772

[22] Filed: Feb. 15, 1995

[51] Int. Cl.⁶ .............................. G06G 7/78; G06F 17/10
[52] U.S. Cl. .......................... 364/449; 364/444; 364/443;
364/460; 340/990; 340/995; 340/438; 342/357;
342/457
[58] Field of Search ...................... 364/449, 458,
364/436, 444, 443, 454, 460, 450, 434,
424.02, 424.04, 424.03; 342/357, 457, 352,
456, 36, 44, 463, 432; 340/995, 988, 990;
370/18; 455/54.1; 375/200; 73/178 R; 33/320,
324

[56] References Cited

U.S. PATENT DOCUMENTS

| | | | |
|---|---|---|---|
| 5,311,197 | 5/1994 | Sorden et al. | 342/457 |
| 5,337,242 | 8/1994 | Yamamoto et al. | 364/449 |
| 5,345,388 | 9/1994 | Kashiwazaki | 364/449 |
| 5,359,528 | 10/1994 | Haendel et al. | 364/424.04 |
| 5,365,516 | 11/1994 | Jandrell | 370/18 |
| 5,416,477 | 5/1995 | Shibata | 364/454 |
| 5,418,537 | 5/1995 | Bird | 342/457 |

*Primary Examiner*—Kevin J. Teska
*Assistant Examiner*—Jacques Louis-Jacques
*Attorney, Agent, or Firm*—Jennifer M. Stec

[57] ABSTRACT

A system and method for using coordinate data indicative of the present location of a vehicle to determine which state the vehicle is in. A receiver obtains the coordinate data and compares it to state boundary coordinate information stored in memory. The angles created by the present coordinate location and each pair of adjacent points along a state's boundary are added. A resulting sum of two times pi (radians) indicates that the present state falls within the state boundary, a result of zero indicates otherwise.

15 Claims, 4 Drawing Sheets

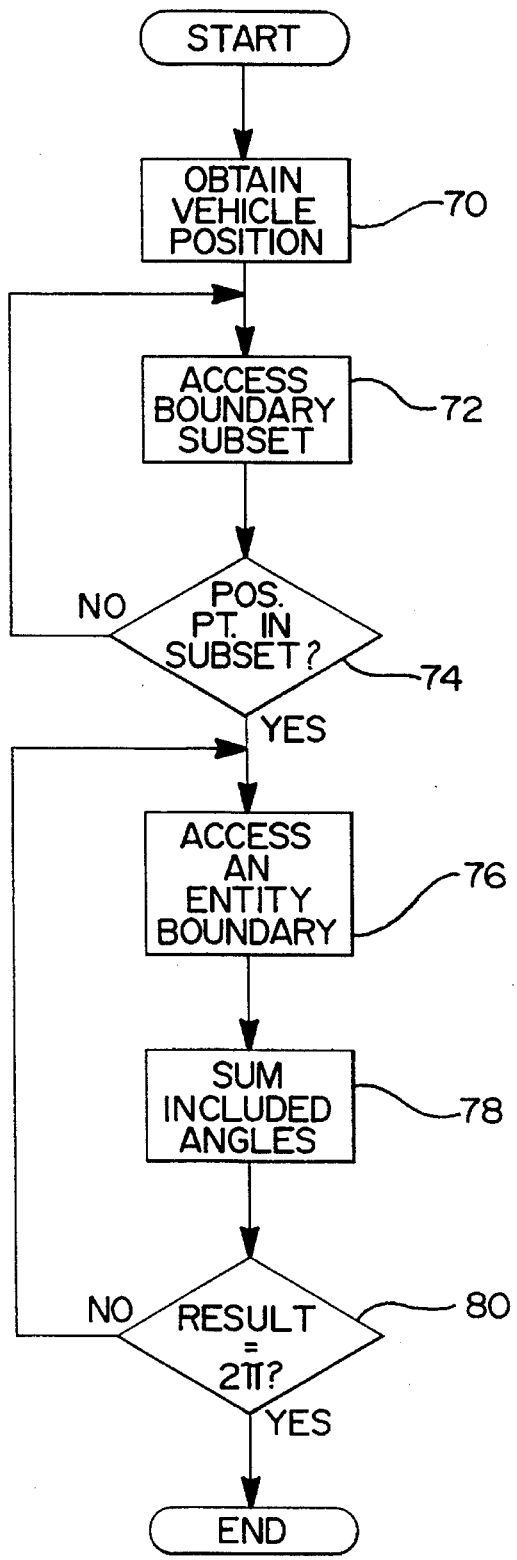

GEOGRAPHIC LOCATOR OF A VEHICLE USING GPS AND ANGLES BETWEEN PAIRS OF ADJACENT BOUNDARY COORDINATE POINTS

BACKGROUND AND SUMMARY OF THE INVENTION

The present invention relates generally to vehicle monitoring systems and, more particularly, to an apparatus and method for automatically determining the state, city, province or other defined geographic entity that a vehicle is in given its latitudinal and longitudinal coordinate location.

With the advent of vehicle fleet management and monitoring systems, elaborate computerized communication systems directed at automatically obtaining and recording vehicle location and a wide variety of other information as a vehicle covers its route, numerous on-board computer systems have evolved. The information collected by these systems can be used for a myriad of purposes which encompass automated customer billing systems, computerized dispatching, trip reporting and other such tasks. One type of information available from an on-board vehicle computer is the present location of the vehicle in terms of its geographic latitude and longitude coordinates. One particularly prevalent way of obtaining this data is through a global positioning system (GPS) receiver which obtains this positional data from signals transmitted by satellite.

However, oftentimes it is necessary to convert the raw coordinate data into a more useful form which provides additional information such as what state, city, province, county or other defined geographical territory the vehicle is in. This information is particularly useful in various fleet and trucking applications such as in performing automated road use tax calculations as well as various trip reporting functions. However, even when coordinate data for the boundary lines of various geographic entities has been pre-stored in memory, the process of individually comparing the current location coordinates to boundary coordinate data for each entity, in order to determine whether the current point lies within that boundary, can become quite computer intensive.

The present apparatus and method provide a more convenient and faster way to determine what state, or other such geographic entity, a vehicle is in given its latitude and longitude coordinates. Comparing the current coordinates to sets of opposing coordinate extremes can be used to provide a gross approximation of the current geographic entity, or at least limit the possibilities to only a few. For each of the possible entities the angles created by radial lines extending from the current coordinate point to consecutive adjacent pairs of points along the entity boundary can be summed. If the current point lies within that boundary, the answer resulting from the summation (in radians) will be two times pi ($2\pi$), otherwise the answer is zero.

This method thereby reduces the computational intensity of determining which of a multiplicity of entities a vehicle is currently located in. This increases overall efficiency in vehicle monitoring systems and can provide a positive confirmation of vehicle location. The present system and method operate without any driver intervention and can simplify or eliminate current driver record keeping tasks. In addition, the information provided can be combined with other data available on-board a vehicle to further increase fleet management functionality.

These and other features and advantages of the present invention will become apparent upon review of the following discussion in view of the accompanying drawings.

BRIEF DESCRIPTION OF THE DRAWINGS

FIG. 4 is a flowchart illustrating the method of the present invention as performed by a microprocessor.

DETAILED DESCRIPTION OF THE PREFERRED EMBODIMENT

Figure 1:
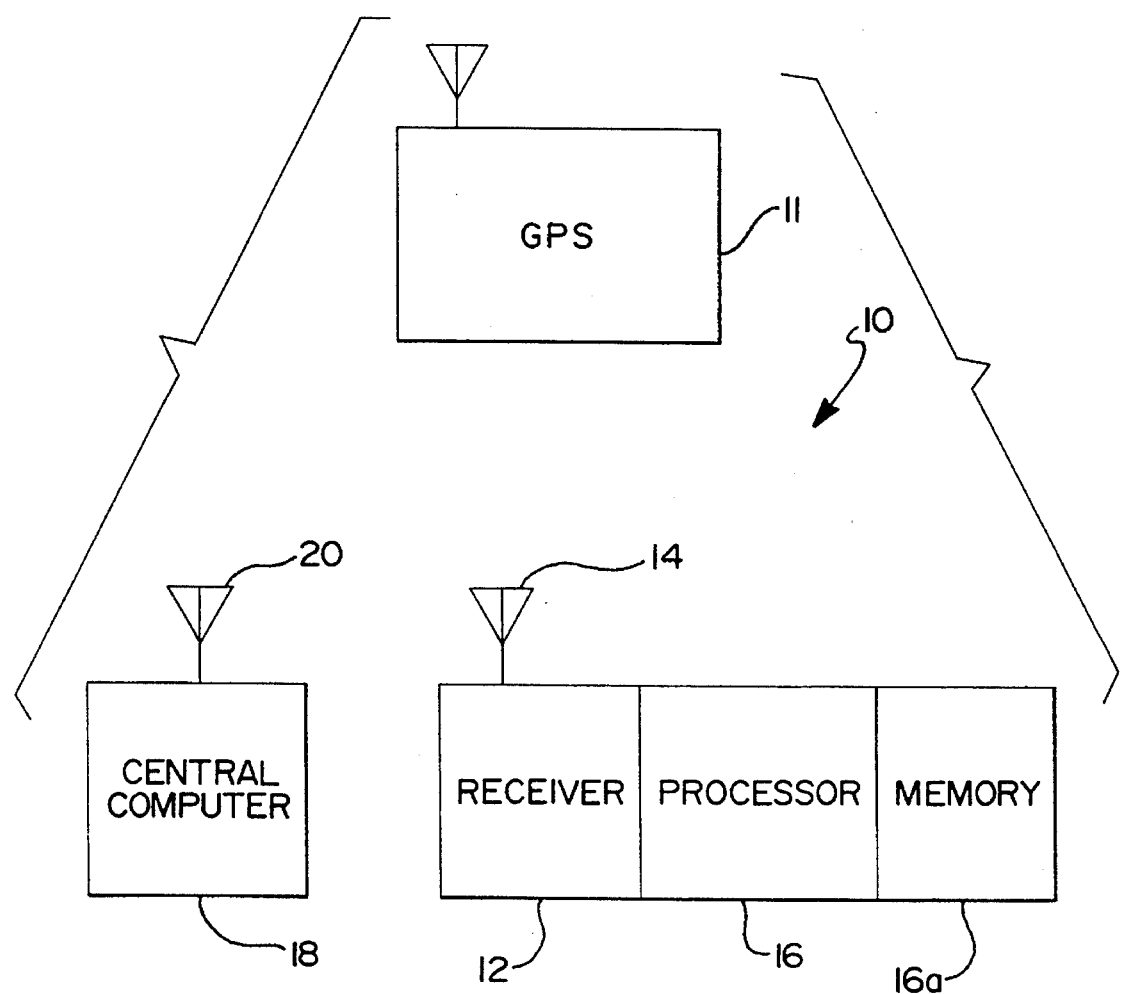
FIG. 1 is a block diagram of the on-board computer system of the present invention as installed in a vehicle along with an associated central computer.

Turning now to the drawings, and in particular to FIG. 1, the on-board computer (OBC) of the present invention is indicated generally at 10. OBC 10 includes a receiver 12 having an associated antenna 14 for receiving signals transmitted by global positioning system (GPS) satellites in orbit around the earth 11. While the present invention utilizes signals provided by a GPS system, it should become readily apparent that the present method and system are equally well suited for use with similar data provided by other systems known to those having skill in the art, such as a loran system. Receiver 12 is preferably a transceiver also capable of providing wireless communication between OBC 10 and a stationary central computer 18 via an antenna 20.

OBC 10 has electrically connected to receiver 12 a processor 16 adapted to perform fairly complex numerical calculations as well as to appropriately provide buffering for input and output data. Processor 16 also preferably includes a memory means 16a, in which coordinate data for boundaries of each of a given set of defined locations are stored. Memory 16a may be any type of suitable device such as ROM, CD-ROM, E-PROM, PROM, PCMCIA, tape, or disk and may also include an associated driver. However, the coordinate boundary data could alternately be stored in appropriate memory of computer 18 if the present method is to be performed off-board.

For simplicity, the present method will be applied to the determination of which state of the United States a particular vehicle is in and the stored boundary information will be described as that pertaining to individual states of the United States. One with ordinary skill in the art, however, will find it readily apparent that the present apparatus and method are thus easily adaptable to any number of geographic areas or territories including municipalities, counties, countries or other locations which can be defined by a closed path or boundary.

Figure 2:
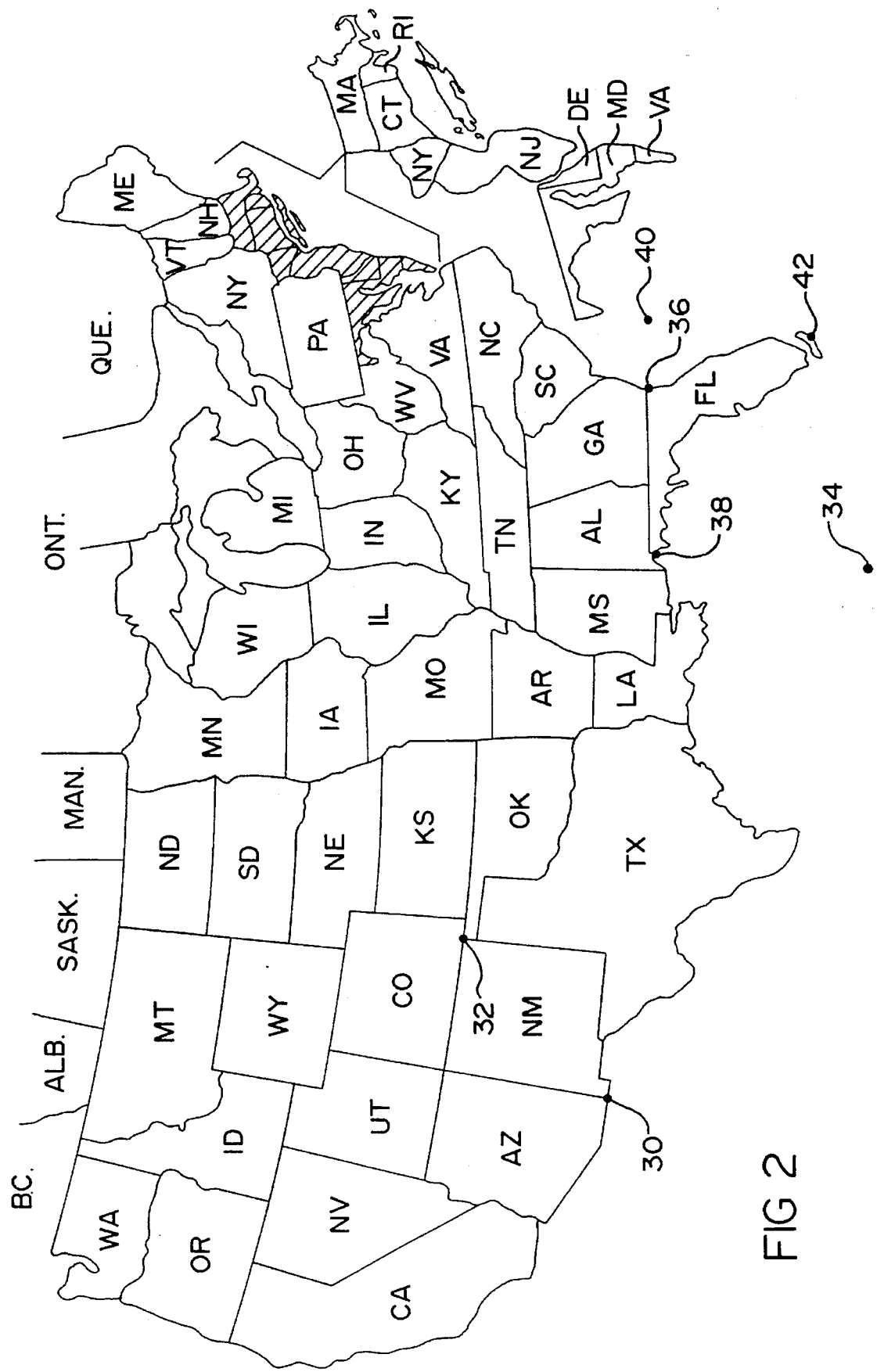
FIG. 2 is a diagrammatic representation of the gross approximation method of the present invention.
Figure 3:
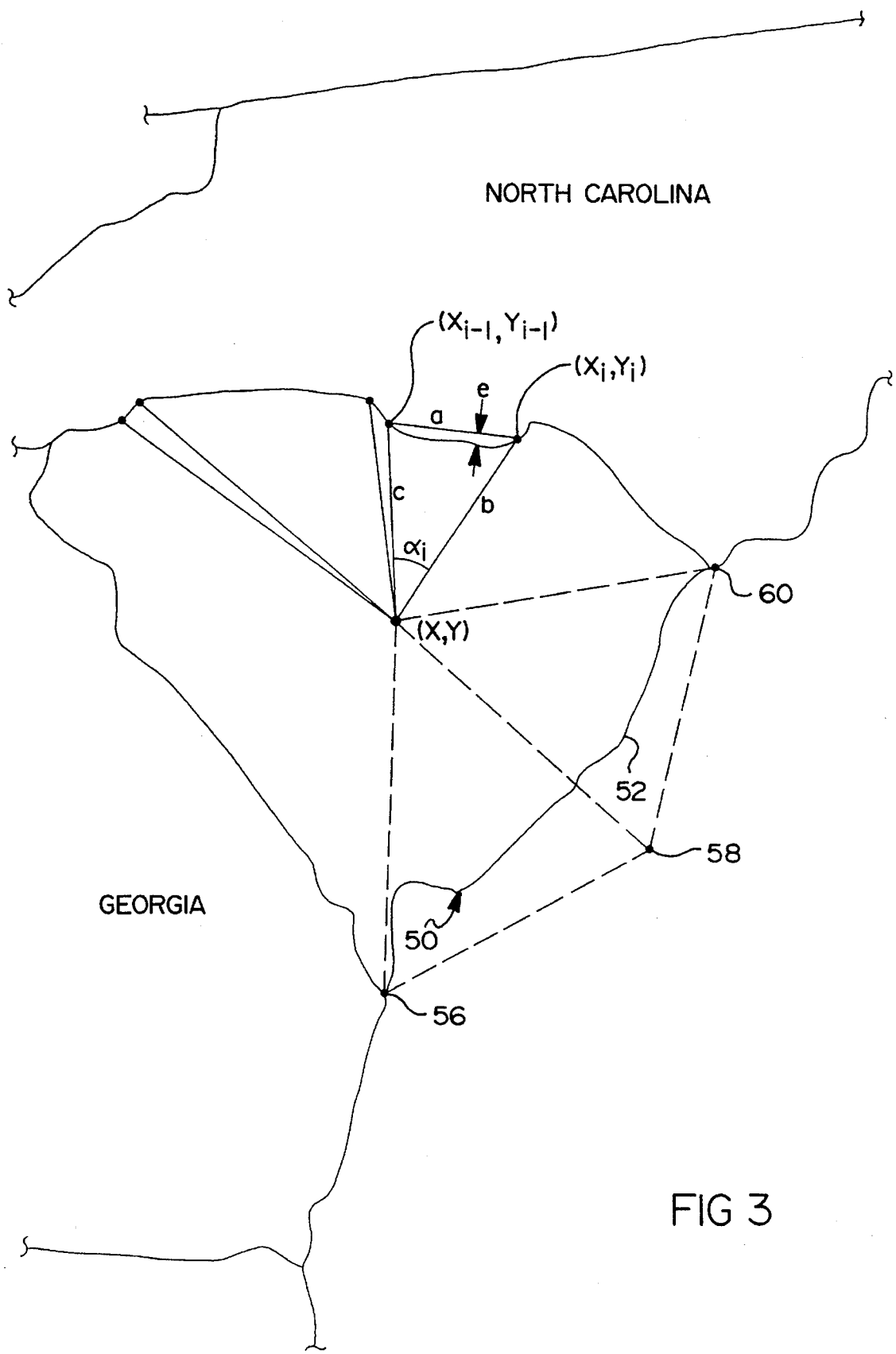
FIG. 3 is a diagrammatic representation of the state confirmation method of the present invention.

The method of the present invention is illustrated in diagrammatic form in FIGS. 2 and 3. This method is preferably implemented in software running on processor 16 but may alternately be run on stationary central computer 18 using coordinate position data obtained by OBC 10 and transmitted to computer 18 via antennas 14 and 18. FIG. 2 illustrates an optional approximation step and FIG. 3 a state confirmation step. Irrespective of whether this approximation step is used or where the method is performed, the geographical coordinates of the vehicle must first be determined, such as through GPS, a loran system or other suitable means, preferably in the form of longitudinal and latitudinal coordinates, these coordinates being represented herein as x, y. To narrow the number of states the vehicle could possibly be in, a number of methods could be utilized. Since many of the states in the United States are approximately rectangular, one preferred method for narrowing down the number of possible states to a relatively small number of states involves comparing the present x, y coordinates to stored points corresponding to opposing points on the boundaries of each state.

For instance, as illustrated in FIG. 2, if points on the southwest and northeast corner of each state are used, coordinates x, y would be compared to points 30 and 32 to determine if the present coordinates possibly fall within the boundary of New Mexico. In this regard, if point x,y falls within latitude and longitude lines intersecting at points 30 and 32, or falls within a predetermined distance from those lines, New Mexico would be included in the subset of possible states. Each of the remaining states could be checked in the same manner. To improve efficiency, however, the entire country is preferably divided into sections, for example into four quadrants, with opposing points in each section checked in order to further decrease the overall number of states needing to be checked in this manner.

Because very few states are entirely encompassed within southwest and northeast corners, and since even in those states there may be small portions of other adjoining states which would also be included within the selected limit points, a coordinate falling within the stored boundary point extremes for a state might also require checking additional states. Such information is preferably pre-programmed in memory 16a of processor 16 (or alternately computer 18) for each state. In addition, the points chosen for performing the approximation may not necessarily lie on southwest/northeast corners, depending upon the shape of the state and where it is located with respect to other states and certain natural boundaries such as large bodies of water. In a state like Florida, boundary points 38 and 40 would preferably be chosen, however points 34 and 36 could be alternately chosen since it is unlikely that a vehicle would be traveling in the Gulf of Mexico. Instead, points 38 and 40 could be chosen to filter out coordinates between and south of these points.

In some cases these point sets would preferably encompass several states, especially small states with very irregular borders such as those in the northeast. Once such an approximation is made and the field of possible states is reduced to a relatively small number, preferably less than four or five, the boundaries of each state in this limited subset can then be compared to the present coordinate data point in order to determine whether or not the present point lies within the boundaries of that state. Depending upon the computational power of processor 16 (or alternately computer 18), as well as on additional factors such as the degree of accuracy required and the overall number of possible entities in which the vehicle may be in, the approximation step can be eliminated and all states or entities evaluated as described below.

Assuming that the present state will be determined onboard, the closed path boundary for each state is preferably pre-stored in the memory 16a of processor 16 as a set of ordered coordinate points. The number of coordinate points chosen for a particular state would depend directly upon the accuracy required and the shape of that state. Turning now to FIG. 3, the state of South Carolina is indicated at 50, surrounded by the neighboring states of North Carolina and Georgia, as well as by the Atlantic Ocean along coastal boundary 52. Choosing adjacent boundary points such as $x_i$, $y_i$ and $x_{i-1}$, $y_{i-1}$ would result in an area of possible error denoted as e. In other words, a coordinate location within area e, although lying within the boundary of North Carolina could result in an incorrect answer of South Carolina. Thus in some areas points may be required to be closer together depending on the desired accuracy. However, to cover the boundary which lies along coast 52 points 56, 58 and 60 could be used to minimize computations.

To determine and confirm which state out of the group of preselected states the vehicle is in, whether all states or those resulting from the approximation method described above, each of these states is addressed individually. In performing this "confirmation" step on South Carolina, the angles created by the triangles formed between coordinates x, y and each adjacent pair of boundary points are summed. For instance, to find $\alpha_1$, the angle having x, y at its vertex and formed by lines c and b connecting x, y to points $x_{i-1}$, $y_{i-1}$, and $x_i$, $y_i$, respectively, wherein these x, y coordinates are all determined by GPS data or previously stored in memory, the following equations can be used:

$$a^2 = b^2 + c^2 - 2bc \cos \alpha_i$$

$$\cos \alpha_1 = \frac{b^2 + c^2 - a^2}{2bc}$$

$$\alpha_1 = \cos^{-1}\left(\frac{b^2 + c^2 - a^2}{2bc}\right)$$

wherein $$a = \sqrt{(x_i - x_{i-1})^2 + (y_i - y_{i-1})^2}$$

$$b = \sqrt{(x_1 - x)^2 + (y_1 - y)^2}$$

and $$c = \sqrt{(x_{i-1} - x)^2 + (y_{i-1} - y)^2}$$

Once each $x_i$ has been calculated, they are summed to determine whether x, y lies within the boundary of that state:

$$\sum_{i=1}^{N} a_1 = 2\pi \text{ radians if within the boundary}$$
$$= 0 \text{ if outside}$$

wherein N varies depending upon the number of boundary points stored for a particular state. If $\alpha$ is calculated in degrees, an answer of 360° will indicate that the present point lies within a given boundary, an answer of zero indicating otherwise.

FIG. 4 further illustrates the method of the present invention in the form of a flowchart, this method preferably being adapted to be implemented in the software and hardware of OBC 10. As shown in the figure, the method begins at block 70 wherein the present vehicle position coordinate location is obtained, such as by receiver 12 from GPS system 11. Optionally, stored points corresponding to entity subsets could be accessed at block 72 and compared with current vehicle position points, to determine whether the current vehicle point lies within that subset in decision block 74. If not, another subset is accessed at 72 and the process repeated until a subset is found.

Once a subset is determined, or if no subset is determined, individual entity boundary information from entities within that subset (or from all entities if no subset is determined) is accessed at 76. The boundary information for the selected entity is compared with the point data at block 78 so as to generate a sum of all of the included angles formed between the current position point and each pair of adjacent points on the entity boundary, these calculations being performed in the manner described in greater detail above. If the summation result is 2π radians in decision block 80, the selected entity is confirmed as that in which the present vehicle position point lies, if not another entity boundary is accessed at 76 and the process repeated.

Thus the present invention provides a computationally unintensive method to accurately determine what state a vehicle is in, given a set of geographic coordinates. It is readily adaptable to a wide variety of uses and serves to minimize or eliminate data needing to be input by a vehicle driver. Combining the location data provided herein with additional information obtainable on-board a vehicle allows additional functions to be performed such as state mileage monitoring, trip recording and even automated route determination and alteration.

The foregoing discussion discloses and describes an exemplary embodiment of the present invention. One skilled in the art will readily recognize from such discussion, and from the accompanying drawings and appended claims, that certain changes, modifications and variations can be made therein without departing from the spirit and scope of the invention as defined by the following claims.

What is claimed is:

1. A system for determining which of a plurality of geographic entities a vehicle is in, wherein each of said entities is defined by a closed path boundary represented by a set of ordered discrete coordinate points, said system comprising:

a position determining system for generating present vehicle position information including a coordinate data point for said vehicle;

receiver means installed on said vehicle for receiving said present vehicle position information;

a memory device containing information including said ordered coordinate points for each of said plurality of entities; and processor means for selecting a set of entities from said plurality of entities and for each entity in said set, adding the angles formed between lines extending from said vehicle position coordinate data point to each adjacent pair of discrete coordinate points representing said closed path boundary to obtain a summation and for identifying the entity for which said summation yields a non-zero result.

2. The system of claim 1 wherein said non-zero result is 2π radians or 360 degrees.

3. The system of claim 1 wherein said position determining system is a global positioning system (GPS) receiver.

4. The system of claim 1 wherein said position determining system is a loran receiver.

5. The system of claim 1 wherein said entities are individual states of the United States.

6. The system of claim 1 wherein said system is installed in said vehicle.

7. The system of claim 1 further comprising means for transmitting said vehicle position information to said processor, wherein said memory and processor means are off-board said vehicle and said positional information is transmitted from said vehicle to said off-board processor.

8. The system of claim 1 wherein said coordinate points are in the form of latitude and longitude.

9. A method of determining which of a plurality of geographic entities a vehicle is in wherein each of said entities is defined by a closed path boundary represented by a set of ordered discrete coordinate points lying substantially on said boundary, said method comprising the steps of:

(a) storing coordinate boundary points for each said entity in a memory, said stored points being associated with the entity boundary defined thereby;

(b) obtaining a coordinate data point indicative of the present geographic position of said vehicle;

(c) for one set of entity boundary coordinates, finding the included angle between lines extending from the current position coordinate point and each pair of adjacent boundary coordinate points and summing said included angles; and (d) repeating step (c) for different sets of entity boundary coordinates until said summation yields a nonzero result.

10. The method of claim 9 wherein said nonzero result is 2π radians or 360 degrees.

11. The method of claim 9 wherein said entities are states of the United States.

12. The method of claim 9 wherein said coordinate points represent latitude and longitude.

13. The method of claim 9 further comprising the step of selecting a subset of entities from said plurality of entities.

14. The method of claim 13 further comprising the steps of:

associating one coordinate data point with each entity;

comparing said vehicle position coordinate data point with each said entity associated point; and including in said subset only those entities having an associated coordinate point within a predetermined distance of said present position coordinate data point.

15. The method of claim 13 further comprising the steps of:

selecting coordinate data points which correspond to predefined subsets of said entities; and performing steps (c) and (d) only on entities in said subset.

* * * * *